(12) United States Patent
McGhan et al.

(10) Patent No.: US 7,023,601 B2
(45) Date of Patent: Apr. 4, 2006

(54) OPTICAL E-FIELD MODULATION USING A MACH-ZEHNDER INTERFEROMETER

(75) Inventors: Douglas McGhan, Ottawa (CA);
Maurice O'Sullivan, Ottawa (CA);
Yves Beaulieu, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/677,223

(22) Filed: Oct. 3, 2003

(65) Prior Publication Data

US 2005/0007642 A1    Jan. 13, 2005

Related U.S. Application Data

(63) Continuation-in-part of application No. 10/307,466, filed on Dec. 2, 2002, which is a continuation-in-part of application No. 10/405,236, filed on Apr. 3, 2003.

(30) Foreign Application Priority Data

Jul. 11, 2003    (WO) .................... PCT/CA03/01044

(51) Int. Cl.
*G02F 1/03*    (2006.01)
*G02F 1/07*    (2006.01)

(52) U.S. Cl. ...................... 359/246; 359/278; 359/276

(58) Field of Classification Search ............ 359/180–3, 359/188, 252, 259, 254, 154, 278, 245–6, 359/237, 298–300, 315–6, 320, 246; 372/26; 398/187, 199, 201; 385/1–9, 14–5, 40, 45

See application file for complete search history.

(56) References Cited

U.S. PATENT DOCUMENTS

| 5,101,450 A | * | 3/1992 | Olshansky ...................... 385/3 |
| 5,148,503 A | | 9/1992 | Skeie .............................. 385/3 |
| 5,311,346 A | | 5/1994 | Haas et al. .................. 398/146 |
| 5,349,312 A | | 9/1994 | Huettner et al. .......... 333/81 A |
| 5,408,498 A | | 4/1995 | Yoshida ...................... 375/286 |
| 5,416,626 A | | 5/1995 | Taylor ........................ 398/185 |
| 5,446,574 A | | 8/1995 | Djupsjobacka et al. ..... 398/147 |

(Continued)

FOREIGN PATENT DOCUMENTS

EP    0 524 758    1/1993

(Continued)

OTHER PUBLICATIONS

Sadhwani, Ram et al "Adaptive CMOS Predistortion Linearizer for Fiber-Optic Links", Journal of Lightwave Technology, Dec. 2003, pp. 3180-3193,vol. 21, No. 12., U.S.A.

(Continued)

*Primary Examiner*—Jordan M. Schwartz
*Assistant Examiner*—Jessica Stultz
(74) *Attorney, Agent, or Firm*—Kent Daniels; Ogilvy Renault

(57) ABSTRACT

A method for modulating the E-field of an optical carrier signal utilizes a Mach-Zehnder modulator having a pair of independently controllable branches. A pair of independent branch drive signals $V_L(t)$ and $V_R(t)$ are derived. Each branch of the MZ modulator is driven with a respective one of the independent branch drive signals. By this means, a low cost conventional MZ modulator (interferometer) can be used to perform complex modulation of the E-field of the optical carrier. In some embodiments, this functionality is used to facilitate precompensation of optical impairments of an optical communications system.

12 Claims, 4 Drawing Sheets

U.S. PATENT DOCUMENTS

| | | | |
|---|---|---|---|
| 5,513,029 A | 4/1996 | Roberts | 398/32 |
| 5,579,328 A | 11/1996 | Habel et al. | 372/31 |
| 5,761,225 A | 6/1998 | Fidric et al. | 372/6 |
| 5,805,321 A * | 9/1998 | Ooi et al. | 398/98 |
| 5,892,858 A | 4/1999 | Vaziri et al. | 385/2 |
| 5,949,560 A | 9/1999 | Roberts et al. | 398/29 |
| 5,999,258 A | 12/1999 | Roberts | 356/450 |
| 6,067,180 A | 5/2000 | Roberts | 398/201 |
| 6,115,162 A | 9/2000 | Graves et al. | 398/116 |
| 6,124,960 A | 9/2000 | Garthe et al. | 398/194 |
| 6,128,111 A | 10/2000 | Roberts | 398/29 |
| 6,205,262 B1 | 3/2001 | Shen | 385/11 |
| 6,262,834 B1 | 7/2001 | Nichols et al. | 359/301 |
| 6,304,369 B1 | 10/2001 | Piehler | 359/337.4 |
| 6,441,932 B1 | 8/2002 | Helkey | 398/5 |
| 6,473,013 B1 | 10/2002 | Velazquez et al. | 341/120 |
| 6,559,994 B1 | 5/2003 | Chen et al. | 398/182 |
| 6,580,532 B1 | 6/2003 | Yao et al. | 398/39 |
| 6,606,424 B1 * | 8/2003 | Ooi et al. | 385/3 |
| 6,693,929 B1 * | 2/2004 | Essiambre et al. | 372/26 |
| 2001/0028760 A1 | 10/2001 | Yaffe | 385/27 |
| 2002/0005975 A1 * | 1/2002 | Nakamoto | 359/254 |
| 2002/0018268 A1 | 2/2002 | Price et al. | 398/147 |
| 2002/0024694 A1 | 2/2002 | Newell et al. | 398/79 |
| 2002/0106148 A1 | 8/2002 | Schemmann et al. | 385/4 |
| 2002/0126934 A1 * | 9/2002 | Burns | 385/2 |
| 2003/0011847 A1 | 1/2003 | Dai Fa et al. | 398/147 |
| 2003/0189745 A1 * | 10/2003 | Kikuchi et al. | 359/237 |
| 2003/0228081 A1 * | 12/2003 | Tavlykaev et al. | 385/3 |
| 2004/0096137 A1 * | 5/2004 | Risser et al. | 385/3 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Andre, P.S. et al "Extraction of DFB Laser Rate Equations Parameters for Optical Simulation Purposes", Conftele 99 ISBN 972-98115-0-4, pp. 561-564.

Illingg, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Direct Digital Synthesis Applications", GaAS IC Symposium, pp. 61-64.

Kamoto, T. et al "An 8-bit 2-ns Monolithic DAC", IEEE Journal of Solid-State Circuits, Feb. 1988, vol. 23, No. 1.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

Adaptive Electronic Linearization of Fiber Optic Links, OFC 2003, vol. 2, pp. 477-480, Mar. 2003 Sadhwani et al.

Automated Measurement of Polarization Mode Dispersion Using Jones Matrix Eigenanalysis, IEE Photonics.

Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjuction, Journal of Lightwave Technology, vol. 14, No. 3, March.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage, date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 μm, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lighwave Technology, vol. 15, No. 2, Fe.

Representation of Second-Order Polarisation Mode Dispersion, Electronics Letters, vol. 35, No. 19, Sep. 16, 1999, A. Eyal et al.

Signal Distortion and Noise In AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nocholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

* cited by examiner

Figure 1c
(PriorArt)
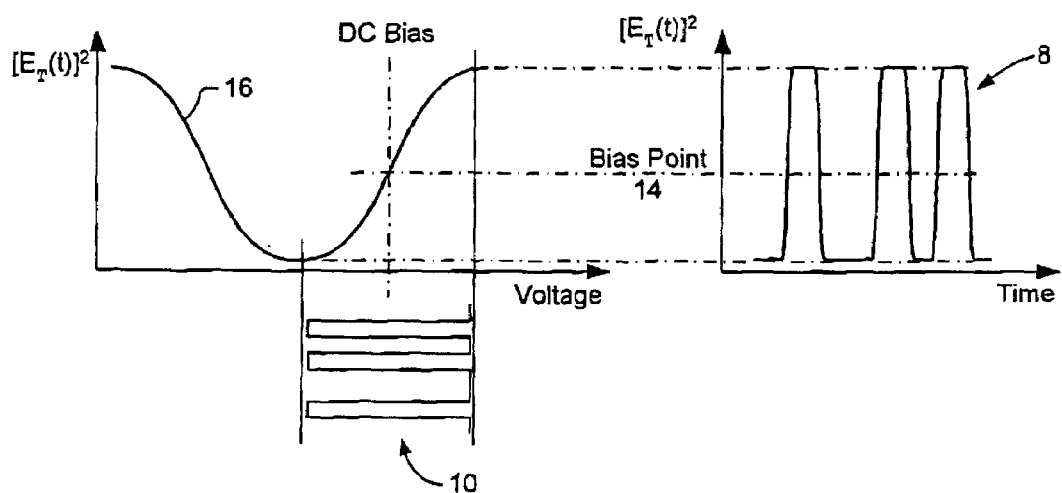

OPTICAL E-FIELD MODULATION USING A MACH-ZEHNDER INTERFEROMETER

CROSS-REFERENCE TO RELATED APPLICATIONS

This application is a Continuation-in-Part of Applicant's co-pending U.S. patent applications Ser. Nos. 10/307,466 filed Dec. 2, 2002; and Ser. No. 10/405,236 filed Apr. 3, 2003. This application also claims priority of International Patent Application No. PCT/CA03/01044 filed Jul. 11, 2003.

MICROFICHE APPENDIX

Not Applicable.

TECHNICAL FIELD

The present invention relates to optical signal transmitters for optical communications systems, and in particular to optical E-field modulation using a Mach-Zehnder (MZ) interferometer.

BACKGROUND OF THE INVENTION

In the optical communications space, various techniques are used to synthesize an optical communications signal for transmission. A popular technique utilizes a laser 2 coupled to an external optical modulator 4, as shown in FIG. 1a. The laser 2 generates a narrow-band continuous wave (CW) optical carrier signal 6 having a desired wavelength. The optical modulator 4 operates to modulate the amplitude and/or phase the carrier signal 6 to generate the optical communications signal 8 based on a drive signal 10 that encodes data to be transmitted. Typically, the drive signal 10 is generated by a driver circuit 12 based on an input data signal x(t).

In the arrangement illustrated in the FIGS. 1a-1b, the optical modulator 4 is provided by a well known Mach-Zehnder (MZ) interferometer. Other types of modulators may be used, depending on the desired type of modulation. For example, an electro-absorptive modulator (EAM) or a variable optical attenuator (VOA) may be used for amplitude modulation; whereas phase shifters are well known for implementing phase modulation. In each case, the driver circuit 12 generates the drive signal 10 by scaling the input data signal x(t) to satisfy the voltage and current requirements of the modulator 4. The driver circuit 12 may also generate one or more bias signals (not shown) for controlling a bias point of the modulator 4 in a manner well known in the art.

In the embodiment of FIG. 1a, the MZ modulator is controlled by a single drive signal 10 V(t), which, in this case, would typically be a scaled version of the input data signal x(t). In FIG. 1b, a "dual-branch" MZ modulator 4 is controlled by a pair of differential drive signals +V(t) and −V(t), which are substantially equal and opposite. The use of a differential pair of drive signals has the well known advantage that a desired amplitude modulation of the communications signal 8 can be obtained with drive signal voltage levels that are approximately half of that required for the single-drive embodiment of FIG. 1a. Additionally, it is possible to minimize undesirable signal chirp by adjusting the scaling factors applied to each of the differential drive signals +V(t) and −V(t)

In either of the above embodiments, the MZ modulator displays a sinusoidal response to the applied drive voltage (or voltage difference in the case of differential drive signals) as shown in FIG. 1c. Thus, a DC bias signal (not shown) is used to drive the modulator 4 to a desired bias point 14 of the response curve 16. The drive signal(s) 10 can then drive excursions of the modulator response, corresponding to maximum and minimum transmittance, respectively. This operation yields an amplitude-modulated optical communications signal 8 which carries the original data signal x(t), and is typically employed to implement On-Off-Keying (OOK) transmission protocols.

As is well known in the art, a directly analogous approach can be employed using a phase shifter as the optical modulator 4. In this case, the drive signal(s) 10 drive excursions of the modulator phase response, which yields a phase-modulated communications signal 8. This technique is typically used to implement Phase Shift Keying (PSK) or, more commonly Differential Phase Shift Keying (DPSK) transmission protocols.

A limitation of the optical signal synthesizers illustrated in FIGS. 1a–1c, is that they are designed to modulate only a single dimension (i.e. amplitude or phase) of the CW optical carrier signal 6 generated by the narrow-band laser 2. However, in some instances it is desirable to modulate two or more dimensions of the CW carrier 6. For example, Applicant's co-pending U.S. patent application Ser. Nos. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003 describe techniques for compensating impairments in an optical link by predistoring an input signal, in the electrical domain, and then using the thus predistorted signal to drive the optical modulator. As described in those applications, successful implementation of this technique, particularly for the case of polarisation dependent and non-linear impairments, requires the use of an optical modulator capable of modulating both the amplitude and phase of the CW carrier 6. Stated more generally, it is desirable to modulate the E-field of the CW carrier, within the complex plane.

Various methods of accomplishing this result are described in Applicant's co-pending U.S. patent application Ser. Nos. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003. As shown in FIGS. 2a and 2b, most of these techniques utilize multiple one-dimensional modulators in combination. Thus, for example, FIG. 2a shows a complex Mach-Zehnder modulator 18 composed of two 1-D MZ modulators 4a, 4b connected in parallel. A complex driver circuit 20 generates the drive signal(s) 10 in the form of In-phase and Quadrature signal components $V_I(t)$, $V_Q(t)$, each of which may be represented by a single signal or a differential signal pair. The drive signals 10 are used to drive a respective one of the branch MZ modulators 4a, 4b. This technique enables arbitrary E-field modulation of the CW carrier 6 throughout the complex I-Q plane.

In FIG. 2b, a conventional 1-D MZ modulator 4 is cascaded with a phase shifter 22. In this case, the complex driver circuit 20 generates the drive signals 10 in the form of amplitude and phase signal components $V_S(t)$ and $V_\phi(t)$ (each of which may be represented by a single signal or a differential signal pair), which are respectively used to drive the MZ modulator 4 and the phase shifter 22. This technique enables arbitrary E-field modulation of the CW carrier throughout the complex polar-coordinate (Amplitude-Phase) plane.

In FIG. 2c, the frequency dependence of conventional lasers on the drive current is used in conjunction with a conventional 1-D MZ modulator 4. In this case, the complex driver circuit 20 generates the drive signal(s) 10 in the form of amplitude and frequency signal components $V_S(t)$ and $V_f(t)$. The amplitude component $V_S(t)$ (which may be represented by a single signal or a differential signal pair) drives the MZ modulator 4 to modulate the amplitude of the CW carrier signal 6 in a conventional manner. The frequency component $V_f(t)$ provides the laser drive current, and is varied to induce desired excursions of the laser frequency. This technique enables E-field modulation of the CW carrier within the complex polar-coordinate (Amplitude-Phase) plane, limited primarily by the frequency response of the laser 2.

All of these prior solutions are advantageous in that they enable E-field modulation of the CW carrier 6. However, the solutions of FIGS. 2a and 2b are expensive, because multiple devices are required. The solution of FIG. 2c requires only a single amplitude modulator 4, but suffers a disadvantage that the laser is current-controlled. In some cases, obtaining the desired frequency modulation of the laser 2 may require very large and/or very rapid changes in the drive signal voltage. This increases the cost of the driver circuit 20, and may result in the production of unwanted noise.

Accordingly, methods and apparatus for cost-effectively modulating the E-field of an optical carrier signal remains highly desirable.

SUMMARY OF THE INVENTION

Accordingly, an object of the present invention is to provide methods and apparatus for modulating the E-field of an optical carrier signal.

Thus, an aspect of the present invention provides a method for modulating the E-field of an optical carrier signal. According to the present invention, a Mach-Zehnder modulator having a pair of independently controllable branches is provided. A pair of independent branch drive signals $V_L(t)$ and $V_R(t)$ are derived. Each branch of the MZ modulator is driven with a respective one of the independent branch drive signals. By this means, a low cost conventional MZ modulator (interferometer) can be used to perform complex modulation of the E-field of the optical carrier. In some embodiments, this functionality is used to facilitate precompensation of optical impairments of an optical communications system.

BRIEF DESCRIPTION OF THE DRAWINGS

Further features and advantages of the present invention will become apparent from the following detailed description, taken in combination with the appended drawings, in which:

FIGS. 1a–1c schematically illustrate principal components and operation of one-dimensional communications signal synthesizers known in the prior art;

It will be noted that throughout the appended drawings, like features are identified by like reference numerals.

DETAILED DESCRIPTION OF THE PREFERRED EMBODIMENT

The present invention provides methods and apparatus for modulating the E-field of an optical carrier signal. Embodiments of the invention are described below, by way of example only, with reference to FIGS. 3–5.

Figure 1A:
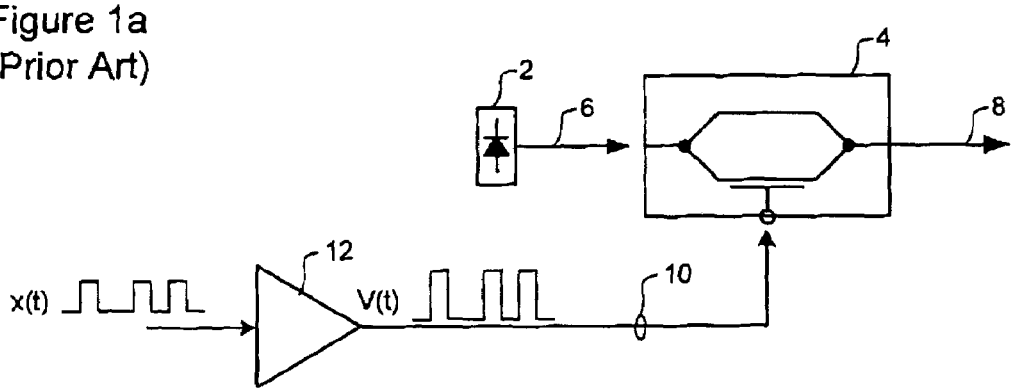
Figure 1B:
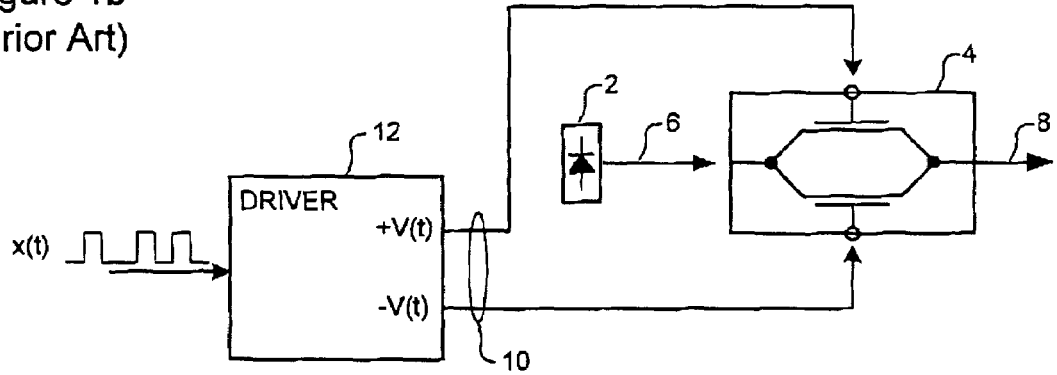
Figure 2A:
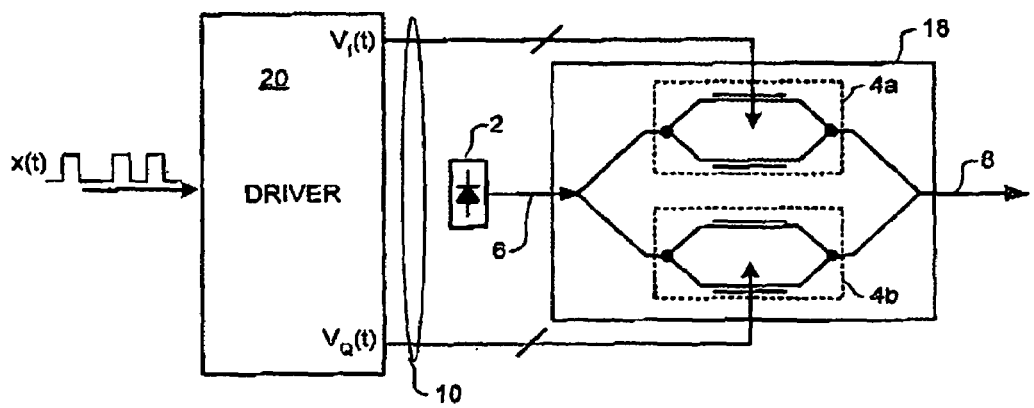
FIGS. 2a–2c schematically illustrate principal components of complex communications signal synthesizers comprising multiple one-dimensional synthesizers of the type illustrated in FIGS. 1a–1c.
Figure 2B:
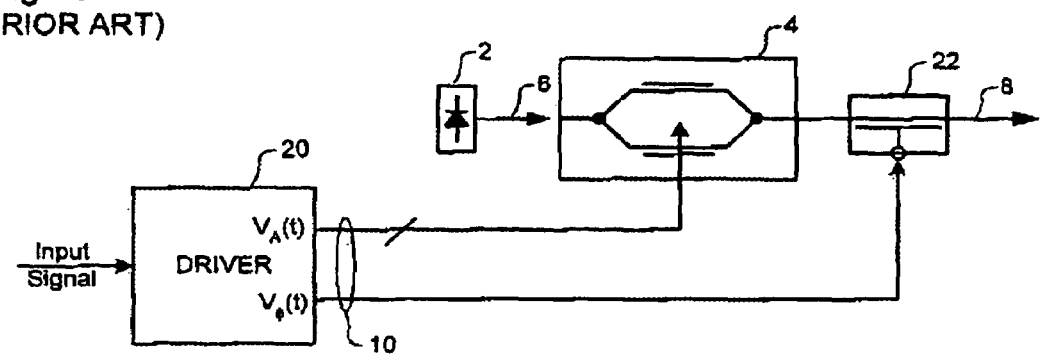
Figure 2C:
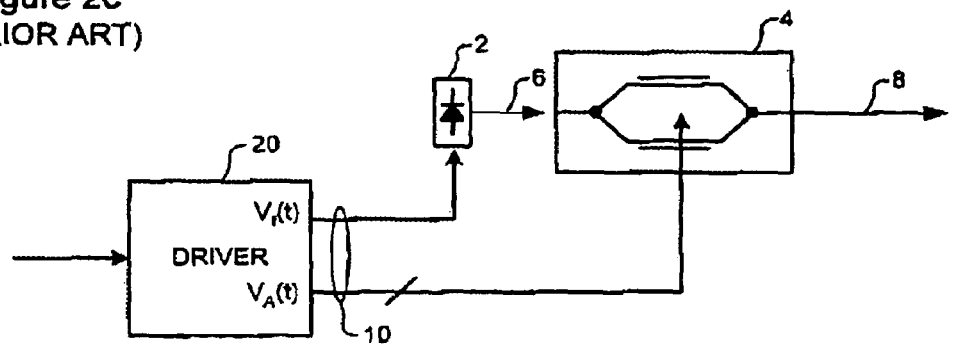
Figure 3:
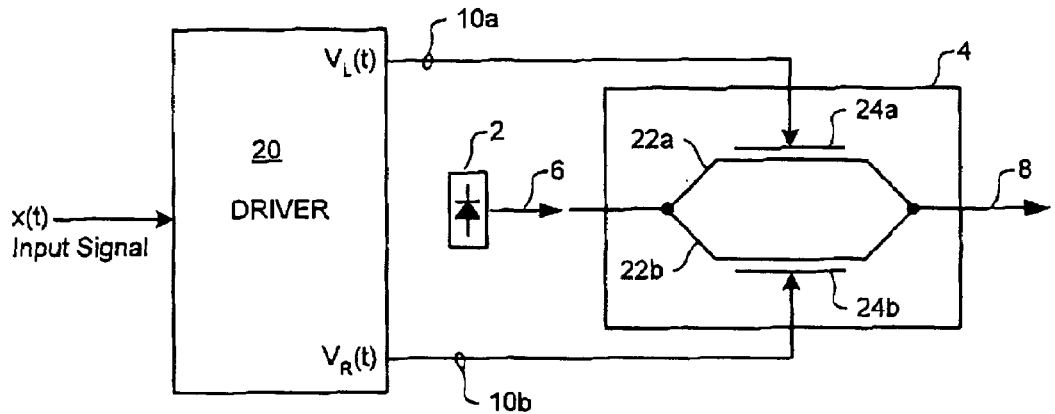
FIG. 3 schematically illustrates principal components of a complex communications signal synthesizer in accordance with an embodiment of the present invention.

For the purposes of understanding the present invention, it is useful to consider a representation of the total optical E-field $E(t)$ as a vector confined to a plane and emanating from a fixed origin, where the length of the vector gives the amplitude of the E-field at any instant (t), and the direction of the vector gives the phase of the field at any instant (t). Within this construction, we consider two basis sets. The first basis set is a Cartesian coordinate system centered on the E-field origin. In this Cartesian representation, the total E-field $E(t)$ is decomposed along the orthogonal h-Phase (I) and Quadrature (Q) direction. The second basis set is a polar coordinate system, again sharing its origin with that of the E-field vector. In this poles representation, the E-field is decomposed into vector length (S) and phase angle ($\phi$) relative to the I direction, These two basis sets are related by a non-linear transformation, in a manner well known in the art. In each of these representations, the time-sequence of loci of the end-point of the E-field vector is referred to as a trajectory of the E-field As shown in FIG. 3, a system in accordance with the present invention comprises a complex driver circuit 20 and a conventional "dual branch" MZ interferometer 4 of the type described above with reference to FIG. 1b. In operation, the complex driver circuit 20 generates a pair of independent drive signals $V_R(t)$ and $V_L(t)$, which are used to drive a respective branch 22 of the MZ interferometer 4. This operation is designed to exploit the optical behaviour of the "dual branch" MZ interferometer, which is characterized by a respective independently controllable phase shifter 24 in each branch 22. With this configuration, conventional amplitude modulation of the CW carrier 6 is obtained by driving each phase shifter 24 with respective equal and opposite drive signals 10. This differential pair of drive signals produces corresponding equal and opposite phase delays experienced by light traversing the two branches 22a, b of the modulator 4, via the well known electro-optical effect The optical power of the recombined lightwave (communications signal) 8 emerging from the MZ modulator 4 varies sinusoidally with the phase angle between the beams traversing the two branches 22.

A trivial alternative mode of operation is to supply the same drive signal to both branches 22 of the "dual branch" MZ interferometer 4. In this case, the differential phase delay will be zero, and the recombined signal a emerging from the modulator 4 will have a constant optical power. However, the (identical) voltage-dependent phase delay experienced by the light traversing the branches 22a and 22b of the modulator 4 will produce corresponding phase changes in the recombined signal 8.

As may be appreciated, if the two branches 22 are independently driven (i.e. the two drive signals 10a and 10b are different) the recombined light wave 8 emerging from the MZ modulator 4 will exhibit excursions of both phase and amplitude. In the present invention, this behavior is exploited by deriving independent drive signals $V_R(t)$ and $V_L(t)$ which are calculated to yield desired excursions of the E-field of the recombined signal 8. In very broad terms, this can be accomplished by representing the total E-field $E(t)$ of the recombined signal 8 in polar coordinates: that is, in terms of orthogonal phase $\phi(t)$ and amplitude $S(t)$ components. Based on the known spectral performance of the MZ modulator 4, it is a simple matter to compute the voltage level $V_\phi(t)$ which, when supplied to both branches 22 of the MZ modulator 4, will produce the desired phase $\phi(t)$ component. Similarly, it is a simple matter to compute the differential voltage levels $\pm V_S(t)$ which, when supplied to respective branches 22 of the MZ modulator 4, will produce the desired E-field amplitude $S(t)$ component. The required drive signals $V_R(t)$ and $V_L(t)$ can then be computed using equations of the form:

$$V_L(t)=V_\phi(t)+V_s(t) \quad (Eq. 1)$$

and $$V_R(t)=V_\phi(t)-V_S(t) \quad (Eq. 2)$$

Those skilled in the art will appreciate that these computations can readily be accomplished using known digital signal processing techniques. Principal components and operation of a complex driver circuit 20 capable of performing this operation are described below with reference to FIG. 4. A practical application of the system of FIG. 4, for compensating dispersion, is also described with reference to FIGS. 5a–5d.

Figure 4:
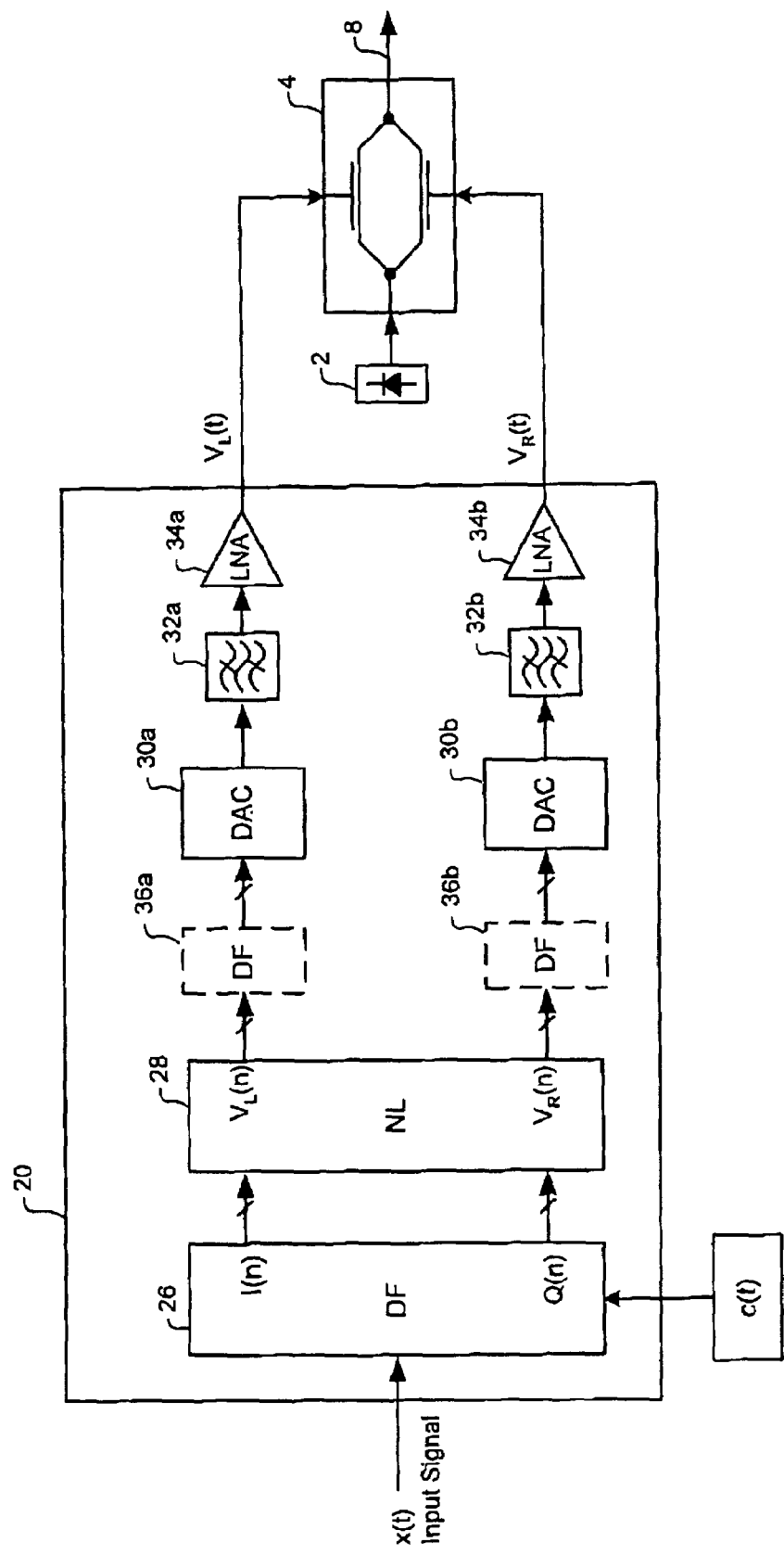
FIG. 4 illustrates principal components and operation of the driver circuit usable in the embodiment of FIG. 3.

In the embodiment of FIG. 4, the complex modulator 20 comprises a digital filter 26 cascaded with a non-linear compensator 28, which cooperate to generate successive digital sample values $V_R(n)$ and $V_L(n)$. These digital sample values are then converted into corresponding analog voltage levels by respective digital-to-analog converters (DACs) 30, filtered (at 32) to reduce out-of-band noise, and scaled by low noise amplifiers 34 to yield the desired drive signals $V_R(t)$ and $V_L(t)$. If desired, respective digital filters 36 may be positioned between the non-linear compensator 28 and the DACs 30 in order to compensate any propagation delay differences between the DACs 30 and the MZ modulator 4.

Various known digital filter types may be used to implement the digital filter 26, such as, for example, Finite Impulse Response (FIR) filters, Infinite Impulse Response (IIR) filters, and Fast Fourier Transform (FFT filters). Alternatively, the digital filter 26 may be implemented using a Random Access Memory Look-up Table (RAM LUT). In either case, the digital filter 26 generates successive sample values $I(n)$ and $Q(n)$, which represent the desired E-Field in Cartesian (In-phase and Quadrature) coordinates, at a sample rate which is about double the bit-rate of the input signal $x(t)$. In a trivial case, this operation can be provided as a simple mapping function, which maps the input signal $x(t)$ (FIG. 5a) onto the complex I-Q plane (FIG. 5b) in which logical "0"s and "1"s of the input signal are shown mapped onto the I-axis. However, as described in applicant's co-pending U.S. patent application Ser. Nos. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003, the digital filter 26 preferably also implements signal predistortion in accordance with a compensation function $C(t)$ which substantially compensates impairments of an optical communications link (not shown). In this case, the E-field $E(t)$ will exhibit arbitrary excursions in the I-Q plane, and sample values $I(n)$ and $Q(n)$ generated by the digital filter 26 may be markedly different from either previous or successive values, as may be seen in FIG. 4c in which the shaded region represents the range of $I(n)$ and $Q(n)$ valves generated by the digital filter 26.

Figure 5A:
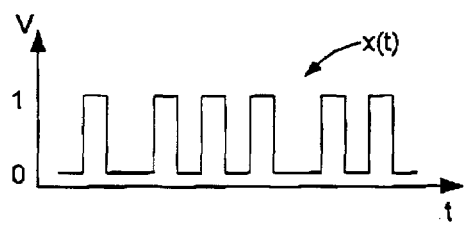
FIGS. 5a–5d schematically illustrate operation of the embodiment of FIG. 3.
Figure 5B:
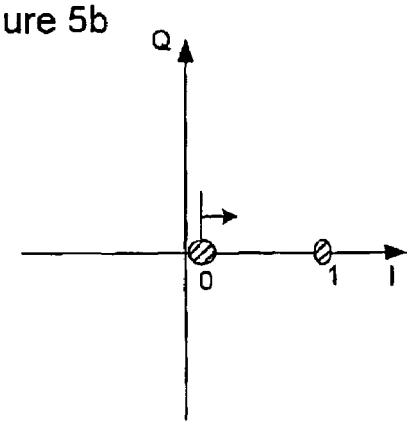
Figure 5C:
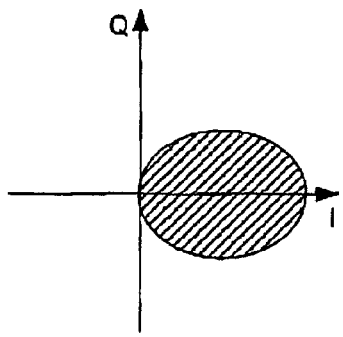
Figure 5D:
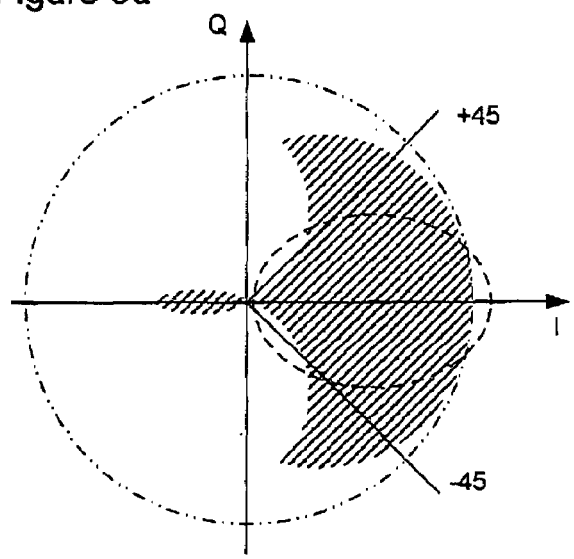

The non-linear compensator 28 converts the Cartesian coordinate sample values $I(n)$ and $Q(n)$ into corresponding polar (amplitude and phase) coordinate values $S(n)$ and $\phi(n)$. In order to limit the drive voltage requirements of downstream components (primarily the DACs 30), these polar coordinate values $S(n)$ and $\phi(n)$ may be scaled and clipped to limit the phase $\phi(n)$ to within a selected range of angles, and to limit $S(n)$ to an amplitude range corresponding to the minimum and maximum points of the modulator response curve 16. For example, the phase $\phi(n)$ may be limited to a range of 90 degrees (i.e. ±45 degrees from the bias point) as shown in FIG. 5d. A wider or narrower angle range may be selected, based on the peak-to-peak voltage limitations of the driver circuit 20.

In order to limit the bandwidth requirements of downstream components, complex E-field signal trajectories crossing very near the origin (which are equivalent to nearly instantaneous phase changes of 180 degrees) should be prevented by suitable scaling and clipping operations. For example, signal trajectories passing very near the origin can be eliminated by applying an offset to the signal such that it is moved away from the origin. In addition, a scaling factor may be applied to the Cartesian coordinate sample values $I(n)$ and $Q(n)$ so as to avoid maximum amplitude values of greater than 1 (that is, greater than the laser output).

In combination, the above-described scaling operations yield polar coordinate values $S(n)$ and $\phi(n)$ concentrated within the dashed line of FIG. 5d. The shaded region of FIG. 5d represents values that are attainable by the MZ modulator 4 when a drive signal peak-to-peak voltage limitation is in place, and the modulator is biased at an appropriate point of the response curve 16. Polar coordinate values $S(n)$ and $\phi(n)$ lying outside of the shaded region are removed by clipping, in a manner well known in the art. As may be appreciated, provided that the amount of such clipping is small, the resulting distortion of the E-field will not unduly disrupt operation of the system.

Once the polar coordinate values $S(n)$ and $\phi(n)$ have been determined, the non-linear compensator 28 computes corresponding drive signal levels $V_S(n)$ and $V_\phi(n)$ (e.g. using a simple look-up table function), and then calculates the required drive signal levels $V_L(n)$ and $V_R(n)$ using equations 1 and 2 above.

The embodiment(s) of the invention described above is(are) intended to be exemplary only. The scope of the invention is therefore intended to be limited solely by the scope of the appended claims.

We claim:

1. A method of modulating the E-field of an optical carrier signal using a Mach-Zehnder modulator having a pair of independently controllable branches, the method comprising steps of:

calculating respective phase and amplitude values $\phi(n)$ and $S(n)$ of a desired optical E-field;

scaling the calculated phase and amplitude values $\phi(n)$ and $S(n)$ to obtain respective scaled phase and amplitude values $\phi'(n)$ and $S'(n)$;

using a phase response of the MZ modulator to calculate a phase signal component value $V_\phi(n)$ required to produce the scaled phase value $\phi'(n)$;

using an amplitude response of the MZ modulator to calculate the amplitude signal component value $V_S(n)$ required to produce the scaled amplitude value $S'(n)$;

calculating corresponding values of a pair of independent branch drive signals $V_L(t)$ and $V_R(t)$ in accordance with:

$$V_L(t)=V_\phi(t)+V_S(t) \text{ and}$$

$$V_R(t)=V_\phi(t)-V_S(t)$$

and driving each branch of the Mach-Zehnder modulator with a respective one of the independent branch drive signals $V_L(t)$ and $V_R(t)$.

2. A method as claimed in claim 1, wherein the step of scaling to calculated phase and amplitude values comprises a step of limiting the phase $\phi$ to a predetermined range of phase angles.

3. A method as claimed in claim 2, wherein the predetermined range of phase angles has a span of less than 180 degrees.

4. A method as claimed in claim 3, wherein the predetermined range of phase angles has a span of about 90 degrees.

5. A method as claimed in claim 1, wherein the step of deriving phase and amplitude values comprises a step of offsetting the calculating phase and amplitude values so as to substantially eliminate trajectories proximal to an origin.

6. A method as claimed in claim 1, wherein the step of scaling the calculated phase and amplitude values comprises a step of limiting the amplitude S to values of one or lower.

7. A method as claimed in claim 1, wherein the stream of successive digital sample values comprises a stream of respective In-Phase (I) and Quadrature (Q) sample values generated on the basis of an input data stream $x(t)$.

8. A method as claimed in claim 7, wherein the In-Phase (I) and Quadrature (Q) sample values are generated by filtering the input data stream $x(t)$ using a compensation function $C(t)$ which compensates impairments of an optical communications link.

9. A system for modulating the E-field of an optical carrier signal, the system comprising:
a Mach-Zehnder (MZ) modulator having a pair of independently controllable branches; and
a complex driver for deriving a pair of independent branch drive signals $V_L(t)$ and $V_R(t)$ based on a stream of successive digital sample values representative of In-Phase and Quadrature components of a desired optical E-field, the complex driver comprising:
a digital filter for generating the stream of successive digital sample values, based on an input data stream $x(t)$;
a non-linear compensator for computing respective drive signal values $V_L(n)$ and $V_R(n)$ based on the stream of successive sample values generated by the digital filter; and
a respective Digital-to-Analog converter for penetrating each of the drive signals $V_L(t)$ and $V_R(t)$ based on a corresponding one of the drive signal values $V_L(n)$ and $V_R(n)$ wherein each branch of the MZ modulator is driven with a respective one of the independent branch drive signals.

10. A system as claimed in claim 9, wherein the stream of successive digital sample values generated by the digital filter comprises a stream of respective In-Phase (I) and Quadrature (Q) sample values generated on the basis of the input data stream $x(t)$.

11. A system as claimed in claim 10, wherein the digital filter is adapted to generate the In-Phase (I) and Quadrature (Q) sample values by filtering the input data stream $x(t)$ using a compensation function $C(t)$ which compensates impairments of an optical communications link.

12. A system as claimed in claim 9, wherein the non-linear compensator is adapted to:
derive respective phase and amplitude signal component values $V_\phi(n)$ and $V_S(n)$ based on the stream of successive sample values generated by the digital filter; and
calculate the drive signal values in accordance with:

$$V_L(t)=V_\phi(t)+V_S(t) \text{ and}$$

$$V_R(t)=V_\phi(t)-V_S(t).$$

* * * * *

UNITED STATES PATENT AND TRADEMARK OFFICE
CERTIFICATE OF CORRECTION

PATENT NO. : 7,023,601 B2
APPLICATION NO. : 10/677223
DATED : April 4, 2006
INVENTOR(S) : Douglas McGhan et al.

It is certified that error appears in the above-identified patent and that said Letters Patent is hereby corrected as shown below:

Column 8, line 12, "penetrating" should read -- generating --.

Signed and Sealed this

Thirty-first Day of October, 2006

JON W. DUDAS
*Director of the United States Patent and Trademark Office*